United States Patent
Greene, Jr. et al.

[11] 3,712,297
[45] Jan. 23, 1973

[54] BLOOD PRESSURE MEASURING DEVICES WITH VARIABLE FREQUENCY RECORDER AND LINEARIZED LEAK MEANS

[75] Inventors: Harry A. Greene, Jr., Sausalito, Charles Wing, El Cerrito, all of Calif.

[73] Assignee: Rembler Company, San Francisco, Calif.

[22] Filed: May 15, 1970

[21] Appl. No.: 37,625

[52] U.S. Cl. ............................................. 128/2.05 Q
[51] Int. Cl. ...................................................... A61b 5/02
[58] Field of Search........128/2.05 A, 2.05 E, 2.05 G, 128/2.05 M, 2.05 P, 2.05 Q, 2.05 R, 2.06 R, 2.1 A, 2.1 R, 204

[56] References Cited

UNITED STATES PATENTS

| | | | |
|---|---|---|---|
| 3,358,683 | 12/1967 | Goitein | 128/204 |
| 3,504,663 | 4/1970 | Edwards | 128/2.05 G |
| 3,126,885 | 3/1964 | Hinman | 128/2.05 M |
| 3,236,230 | 2/1966 | Follett | 128/2.05 A |
| 3,101,082 | 8/1963 | Steen et al. | 128/2.05 M |
| 2,660,164 | 11/1953 | Hasbrouck, Jr. | 128/2.05 Q |
| 3,319,623 | 5/1967 | London | 128/2.05 A |
| 2,720,113 | 10/1955 | Statham | 128/2.05 Q |
| 3,085,567 | 4/1963 | Vigilante | 128/2.05 A |
| 3,104,661 | 9/1963 | Halpern | 128/2.05 A |

Primary Examiner—William E. Kamm
Attorney—Flehr, Hohbach, Test, Albritton & Herbert

[57] ABSTRACT

A blood pressure measuring device is disclosed in which variations in pressure are translated into variations in frequency which are then magnetically recorded. A pressure controlled switch superimposes pressure reference pulses on the variations in frequency and audible brachial pulses are simultaneously recorded. An approximately linear looking pressure variation characteristic is obtained by varying the area of a leak off opening over the pressure range.

3 Claims, 5 Drawing Figures

INVENTORS
HARRY A. GREENE, JR.
CHARLES WING
BY Flehr, Hohbach, Vest,
Albritton & Herbert
ATTORNEYS INVENTORS
HARRY A. GREENE, JR.
CHARLES WING
BY
Flehr, Hohbach, Vest,
Albritton & Herbert
ATTORNEYS

3,712,297

BLOOD PRESSURE MEASURING DEVICES WITH VARIABLE FREQUENCY RECORDER AND LINEARIZED LEAK MEANS

FIELD OF THE INVENTION

The present invention relates generally to a device for measuring blood pressure and more particularly to a portable device for automatically measuring and recording blood pressures.

DESCRIPTION OF THE PRIOR ART

The usual method of taking blood pressures make use of a conventional sphygmomanometer with which a physician or other trained person determines blood pressure readings from a column of mercury as pneumatic pressure within a cuff strapped to the limb of a subject is allowed to decrease at a slow and steady rate by means of a valve. Utilizing a stethoscope applied to the brachial artery below the cuff, the physician or other skilled person notes when the cuff pressure passes through the systolic and diastolic pressure values. These pressure values are determined from the audio pulses which are picked up by the stethoscope. Generally, such pressure readings are taken as the pneumatic pressure within the cuff is being relieved, so that the systolic and diastolic pressure values are observed and recorded in that order. The utilization of such devices is time consuming and requires a high degree of skill to accurately sense and interpret the audible pulses picked up by the stethoscope.

It is well known that this usual method of taking blood pressure measurements can be very misleading. The inherent minor fluctuations of an individual's blood pressure, plus the variable response of blood pressure to emotional and physical stress make it very difficult for the physician to obtain a correct picture of a patient's blood pressure. In addition, the pressor effect which results from the presence of a physician or/and observer while the patient's blood pressure is being taken, has an effect on the blood pressure. Further, conventional blood pressure measurements taken in a clinic or physician's office give little information with respect to a patient's blood pressure during his normal day-to-day activities.

In an attempt to overcome the difficulties encountered in the use of conventional sphygmomanometers, various more complex devices have been developed. However, most of these devices have not satisfactorily solved the problem of obtaining accurate blood pressure measurements.

A very improved portable blood pressure measuring device is described in U.S. Pat. No. 3,126,885, issued Mar. 31, 1964, and assigned to the HYPERTENSION RESEARCH FOUNDATION. The present invention is an improvement on the portable blood pressure measuring device of that patent.

BRIEF SUMMARY OF THE INVENTION

It is an object of this invention to provide an improved blood pressure measuring device.

Another object of this invention is to provide a portable blood pressure measuring device which is lightweight and compact, and which does not require the services of highly skilled personal during the operation thereof.

Another object of this invention is to provide a blood pressure measuring device which measures and records a variable frequency modulated signal, representing pressure being applied to the brachial artery of an individual.

Still another object of this invention is to provide a blood pressure measuring device which measures and records a linear variable frequency modulated signal representing pressure being applied to the brachial artery of an individual, and simultaneously records pressure calibration signals and audible brachial pulse beats.

Briefly, according to one embodiment of the invention, there is provided means for selectively applying pressure to a selected artery of an individual which is greater than the systolic pressure value and which temporarily collapses the artery and occludes the flow of blood therein. Means are also provided which are connected to the pressure applying means for linearly reducing the pressure applied to the artery to a pressure below the diastolic blood pressure value. Means are provided for translating this pressure variation into a variation of an electrical characteristic and for recording that electrical characteristic. Means are also provided for generating and recording a calibrating signal simultaneously with the pressure and heart sound signals.

BRIEF DESCRIPTION OF THE DRAWINGS

Other objects and advantages of the present invention will become apparent from the following detail description of a preferred embodiment thereof and considered in conjunction with the accompanying drawings, wherein.

DESCRIPTION OF THE PREFERRED EMBODIMENT

Figure 1:
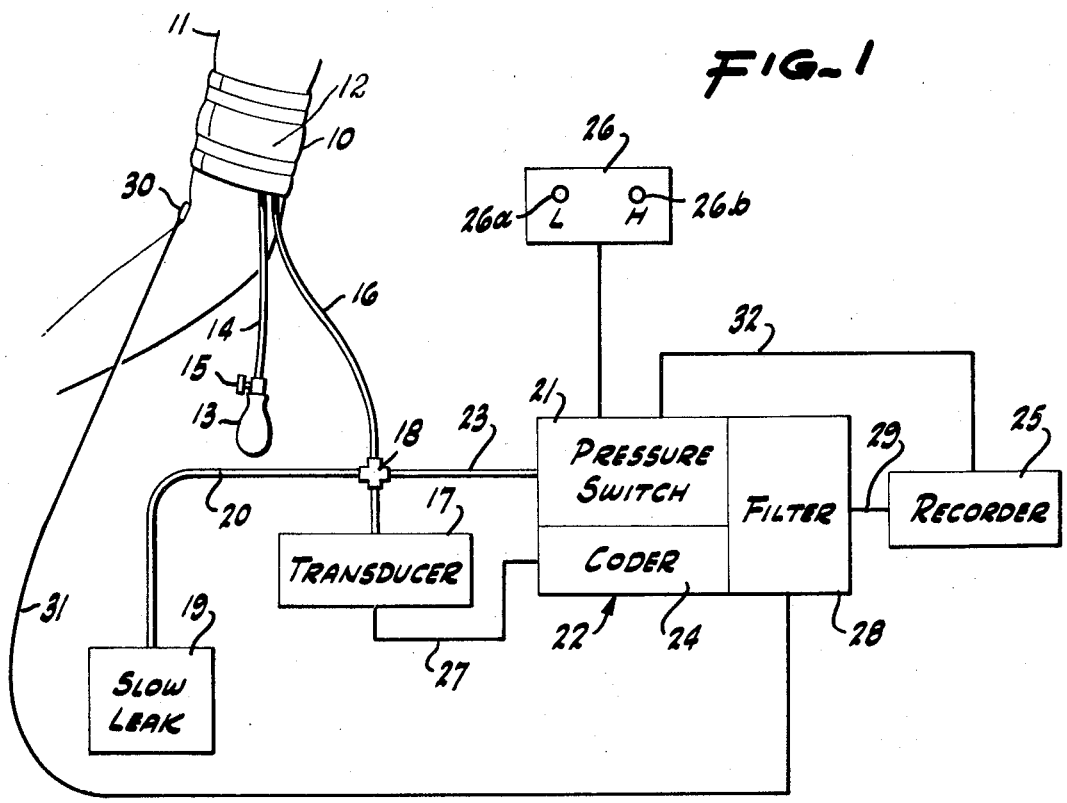
FIG. 1 is a block diagram of a preferred embodiment of a portable blood pressure measuring device in accordance with the present invention during utilization by a patient.

Referring now to FIG. 1, there is shown a diagramatic representation of one embodiment of a blood pressure measuring device as affixed to a patient for self-operation. Specifically, a pressure cuff 10 is shown wrapped about the patient's upper arm 11. The cuff 10 is utilized to cut of or occlude the flow of blood through the brachial artery and is preferably of a conventional type having an internal air bag 12 and a pressure bulb 13 connected thereto through a tube 14. The pressure bulb 13 is provided with a release valve 15 for effecting the rapid release of pressure within the cuff after the desired pressure readings are taken. An additional tube 16 extends from the air bag within the cuff 10 and communicates with a pressure transducer 17 through a conventional four-way-connection 18. The pressure transducer 17 serves to translate variations in pressure applied through the tube 16 to variations in an electrical characteristic. The pressure transducer may be of any suitable type wherein the variation and pressure may be translated to a resistance, voltage or current variation. In a preferred embodiment of the invention a variation in resistance is utilized.

A slow leak device 19 is also connected to the coupling 18 through a tube 20. The slow leak serves to deflate the cuff 10 in a uniform linear manner after it has been inflated by the air bulb 13 to a pressure value above the systolic pressure of the individual. The gradual leak causes the pressure in the cuff to decrease through the pulse pressure region so that measurements of diastolic and systolic pressure values can be effected. A more detailed description of the slow leak device 19 in accordance with the principles of this invention may be found hereinafter.

The fourth opening of the connecter 18 is coupled to a switch portion 21 of a coder assembly 22 through a tube 23. The switch is pressure operated and can be adjusted for high (above systolic) and low (below diastolic) pressure values during calibration, as is fully described in U.S. Pat. No. 3,126,885 of which the present invention is an improvement. At the low value of pressure the switch is utilized to actuate the apparatus so that a coder section 24 and a recorder 25 are rendered effective. At the high value of the pressure, a signal is employed whereby the patient is apprised that sufficient pressure has been build up in the cuff to collapse the artery and that he can discontinue the inflation thereof. To this end signal lights are coupled to the pressure switch for indication of the low and high pressure values.

The output of the pressure transducer 17 is applied to the coder section or frequency modulation circuit 24 of the coder assembler 22 through the conductor 27. The frequency modulating circuit or coder serves not only to transmit the transduced signal to the recorder but also provides significant coding pulses thereon, as will be more fully explained hereinafter. To this end, the coder translates the variable resistance of the transducer 17 to variations in frequency and feeds the frequency modulated signal to the recorder 25 through a filter section 28 and a conductor 29.

In addition to the pressure cuff 10, an audio transducer 30 is affixed to the patient's arm and is placed over the brachial artery. When audible brachial pulse sounds are produced, the transducer receives and transmits the sounds through a conductor 31 to the filter section 28 of the coder assembly 22. After being filtered, the pulse signals are passed to the recorder 25 through the conductor 29 along with the filtered coded pressure signals from the frequency modulating circuit 24. However, such audible brachial pulses are only produced when the pressure applied to the brachial artery by the cuff 10 is less than the systolic pressure value and greater than the diastolic pressure value.

The recorder 25, whereto the signals are simultaneously transmitted, is preferably of the miniature magnetic type which can be readily carried by the patient and can be either of the single or multiple channel type. In the embodiment shown in FIG. 1, the recorder is rendered effective and turned off by the pressure switch section 21 of the coder assembly through a conductor 32.

The recorder 25, filter 28, pressure switch 21 and coder 24 may be of the same general type as disclosed in detail in U.S. Pat. No. 3,126,885, or electronics equivalent thereto may be utilized. The focus of this invention is on an improved slow leak device 19 and transducer 17.

Figure 2:
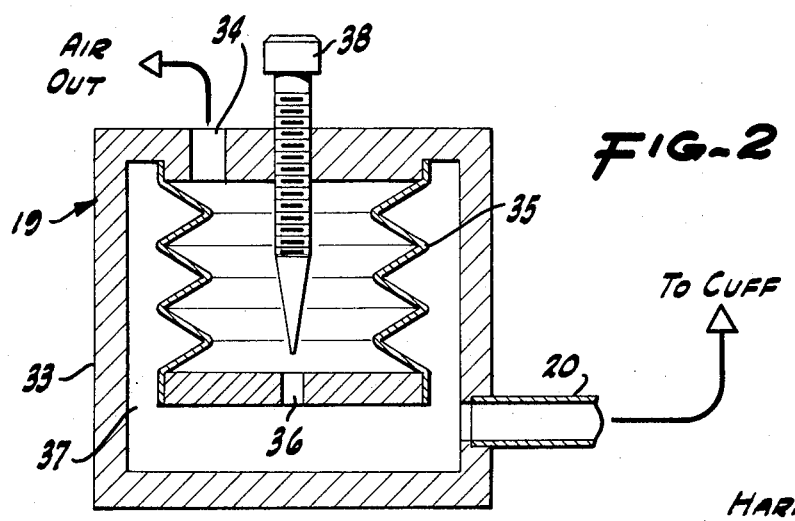
FIG. 2 is a sectional view of a slow leak device included in the system of FIG. 1.

Referring now to FIG. 2, there is shown a sectional view of a slow leak device 19. Since the rate of flow of gas from a vessel under pressure through an opening is logarithmic, any graphic read-out of pressure versus time would appear as a logarithmic curve. A longer time would be required to deflate the cuff and interpreting the graphic read-out would be more difficult. The slow leak device 19 illustrated in FIG. 2 alleviates this problem. Specifically, the slow leak device 19 comprises a housing 33 which contains a leak off opening generally indicated by reference numeral 34. A bellows 35 is located within the housing 33 and surrounds the opening 34. The bellows 35 also has an aperture 36 which communicates with a chamber 37 defined by the bellows 35 and housing 33. An adjustable tapered needle 38 projects through the housing 33 into the bellows 35 in line with the aperture 36. The chamber 37 surrounding the bellows 35 is connected by tubing 20 to the cuff 10. When the cuff is inflated the increased pressure in the chamber 37 compresses the bellows 35 so that the tapered portion of needle 38 extends part way through the aperture 36 to reduce the effective area thereof and allow only a small portion of the air in chamber 37 to escape. As the pressure in the cuff and consequently in the chamber 37 decreases, the bellows 35 expands and the aperture 36 recedes from the needle 38 to increase the effective area of the aperture 36 with diminishing pressure, allowing a greater volume of air to escape. Thus a simple and very effective means is provided for allowing the pressure in the cuff to decrease in an approximately linear fashion.

Figure 3:
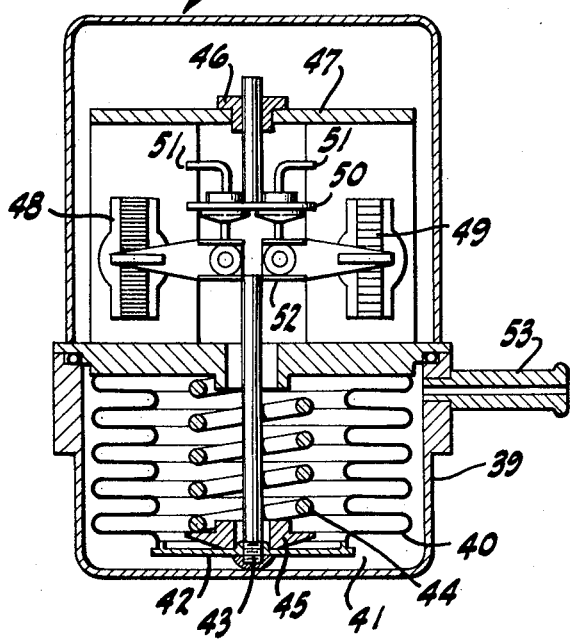
FIG. 3 is an elevation partly in section of a transducer included in the system of FIG. 1.

Turning now to a consideration of FIG. 3, there is shown an elevation partly in section of the transducer 17 constructed in accordance with the principles of this invention. The transducer 17 comprises a chamber housing 39 within which is disposed a bellows 40 to define an air chamber generally indicated by reference numeral 41. The bellows 40 has a rigid portion 42 to which a shaft 43 is suitably rigidly affixed, as by soldering for example. A spring 44 surrounds shaft 43 and extends between the top of the chamber housing 33 and a spring plate 45 which abuts the rigid portion 42 of bellows 40. The spring 44 tends to expand bellows 40 to the position shown in FIG. 1.

The shaft 43 extends upward out of the chamber housing 39 and is loosely centered by a journal 46 in a support member 47 which may be rigidly attached to chamber housing 39. Also mounted on support member 47 are a potentiometer 48 and a segmented switch 49. The shaft 43 has a plate 50 rigidly attached thereto and mounted in the plate 50 are a pair of insulated support brackets 51. The insulated support brackets carry an insulated wiper 52 which has electrically conducting portions adjacent the ends thereof for contacting the potentiometer 48 and the segmented switch 49.

In operation, the chamber 41 communicates with the cuff pressure through an outlet 53. As the cuff pressure is increased the bellows 40 is compressed against the action of the spring 44, forcing the shaft 43 upward and the wiper 52 to the top of potentiometer 48 and segmented switch 49. As the cuff pressure decreases (in a linear fashion as discussed above) the spring 44 expands bellows 40 and the wiper 52 linearly moves down potentiometer 48 and segmented switch 49.

Figure 4:
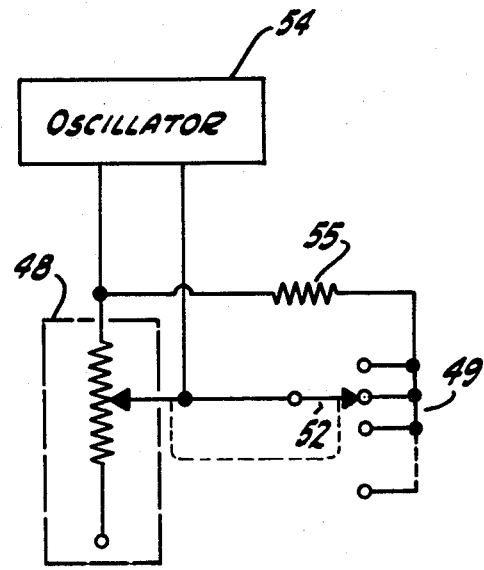
FIG. 4 is a circuit diagram of the transducer of FIG. 3.

The potentiometer 48 is connected in an oscillator circuit and the wiper 52 varies the resistance in the oscillator circuit to alter the frequency of the oscillator. The segmented switch 49 when closed serves to insert an additional resistance in the oscillator circuit to provide discontinuous reference pulses in the oscillator output. Referring now to FIG. 4, there is shown a schematic circuit diagram illustrating the manner in which the potentiometer 48 and the segmented switch 49 function. The wiper and one end of potentiometer 48 are connected to an oscillator 54 and movement of the wiper changes the resistance in the oscillator circuit to change the frequency of the oscillator. Suitable oscillators are well known in the art, such as for example the oscillator shown and described in U.S. Pat. No. 3,126,885. As shown in FIG. 4, the closing of segmented switch 49 serves to insert an additional resistance 55 in the oscillator circuit, thereby discontinuously altering the output frequency of the oscillator 54.

The function of segmented switch 49 is to insert reference pulses in the output of oscillator 54. The segmented switch 49 is calibrated so that the reference pulses correspond to pressure values. For example, conducting segments may be spaced on the segmented switch 49 in such a manner that movement of the wiper 52 from one conducting sement to the next corresponds to a 10 mm of mercury pressure change in the cuff pressure. Of course, the segmented switch 49 may be constructed in a manner to provide as many or as few reference pulses as desired. In one specific embodiment of the invention nineteen reference pulses are provided over a pressure range of 240 to 50 mm of mercury. The reference pulses are spaced 10 mm of pressure apart except that no reference pulse is generated at some pressure value, 130 mm of mercury for example, in order to aid in calibrating graphic readouts.

Figure 5:
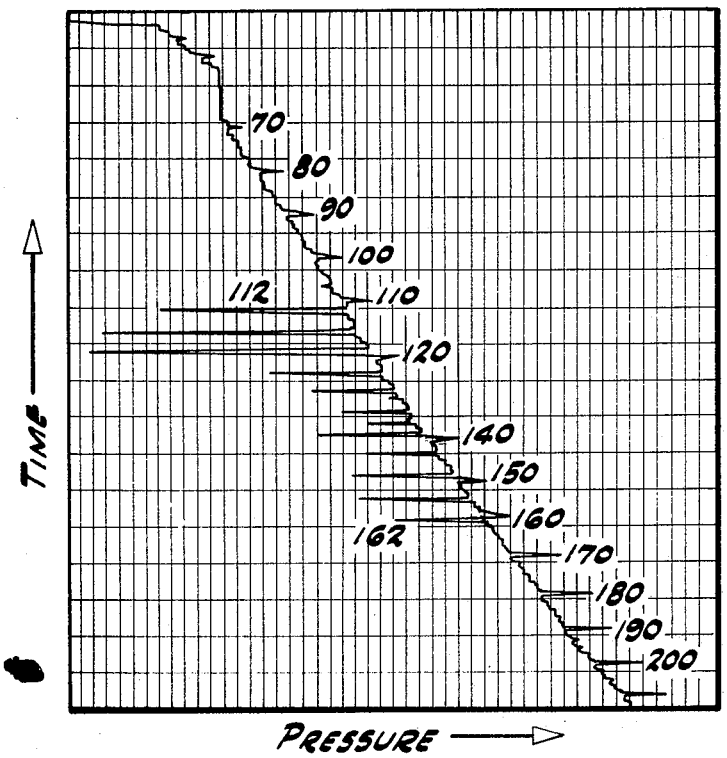
FIG. 5 is a graph of a plurality of waveforms including a pressure signal, reference signals and audible brachial pulses.

Referring now to FIG. 5, there is shown a graphic read-out of blood pressure measurements obtained and recorded with the apparatus of this invention. The general diagonal characteristic represents the diminishing pressure in the cuff as air is allowed to leak off. The discontinuous pulses to the right of the diagonal characteristic are the reference pulses generated by the segmented switch. Note the absence of a reference pulse at 130 mm of mercury pressure. The pulses to the left of the diagonal characteristic are the audible brachial pulses and by interpolation it can be seen that this blood pressure measurement yielded a systolic pressure of 162 mm of mercury and a diastolic pressure of 112 mm of mercury.

We claim:

1. A blood pressure measuring device comprising cuff means for contacting a selected artery of an individual, means for selectively applying cuff pressure to said cuff means to temporarily collapse the artery and occlude the flow of blood therein, means for slowly leaking off the cuff pressure in an approximately linear fashion comprising a bellows having an aperture in an end thereof and an adjustable tapered needle which projects into said aperture whereby the effective area of said aperture is varied depending upon the relative state of compression or expansion of said bellows, oscillator means having a resistance controlled frequency and responsive to variations in the cuff pressure for generating a pressure signal which correspondingly varies in an approximate linear fashion in frequency, means responsive to pressure variations for generating a plurality of reference signals comprising a segmented switch having a wiper and a plurality of conducting segments, means for moving said wiper in response to a variation of cuff pressure for sequentially contacting said plurality of conducting segments, said means for moving said wiper comprising a bellows to which said wiper is coupled, means connected to said wiper and said segmented switch conducting segments for discontinuously affecting said oscillator, said means connected to said wiper and said segmented switch for discontinuously affecting said oscillator means comprising a resistance which is momentarily inserted in said oscillator having a resistance-controlled frequency to discontinuously change momentarily the frequency output thereof, and means to superimpose said plurality of reference signals on said pressure signal.

2. An apparatus for measuring blood pressure in an artery comprising cuff means for applying pressure to the artery to cut off the flow of blood therein, means connected to said cuff means for slowly reducing the applied pressure in a substantially linear manner, an oscillator including an adjustable resistance, the frequency of oscillation of said oscillator being controlled by said adjustable resistance, means for varying the frequency of said oscillator according to the magnitude of said applied pressure including a pressure sensitive bellows assembly connected to said cuff means and responsive to the applied pressure, adjustment means for varying said adjustable resistance, means coupling said adjustment means to said pressure sensitive bellows assembly, a switch having a movable contact and a plurality of spaced, fixed contacts, an additional resistance means connected to said fixed contacts and said oscillator means operatively connecting said movable contact to said bellows assembly for advancing said movable contact between successive ones of said fixed contacts as said applied pressure decreases, said movable contact engaging said fixed contacts only one at a time to connect momentarily said additional resistance to said oscillator to produce momentary discontinuities in the output frequency of said oscillator when the applied pressure is at predetermined reference levels, means responsive to brachial pulses in the artery for generating signals corresponding thereto, and means for superimposing said signals on the output of said oscillator.

3. Apparatus as in claim 2 wherein the means for slowly reducing the applied pressure includes a leak-off opening in communication with said cuff means and means for varying the area of said opening as the applied pressure decreases.

* * * * *